(12) United States Patent
Momber (10) Patent No.: US 7,259,479 B1
(45) Date of Patent: Aug. 21, 2007

(54) TRANSFORMERLESS POWER SUPPLY, DUAL POSITIVE OR DUAL NEGATIVE SUPPLIES

(75) Inventor: Gregory J. Momber, Grand Rapids, MI (US)

(73) Assignee: Robertshaw Controls Company, Holland, MI (US)

( * ) Notice: Subject to any disclaimer, the term of this patent is extended or adjusted under 35 U.S.C. 154(b) by 0 days.

(21) Appl. No.: 09/913,859

(22) PCT Filed: Feb. 18, 2000

(86) PCT No.: PCT/US00/04152

§ 371 (c)(1),
(2), (4) Date: Mar. 28, 2002

(87) PCT Pub. No.: WO00/49707

PCT Pub. Date: Aug. 24, 2000

Related U.S. Application Data

(60) Provisional application No. 60/120,586, filed on Feb. 18, 1999.

(51) Int. Cl.
*H02J 1/00* (2006.01)
(52) U.S. Cl. .................................................... 307/82
(58) Field of Classification Search ............... 363/126, 363/70; 307/72, 82
See application file for complete search history.

(56) References Cited

U.S. PATENT DOCUMENTS

| 4,591,728 | A |   | 5/1986  | Kruger et al.               |
|-----------|---|---|---------|-----------------------------|
| 4,843,831 | A | * | 7/1989  | Yamada ................. 62/155 |
| 5,270,913 | A | * | 12/1993 | Limpaecher ............. 363/140 |
| 5,498,991 | A | * | 3/1996  | Tanoi ..................... 327/333 |
| 5,621,631 | A | * | 4/1997  | Vinciarelli et al. ......... 363/89 |
| 5,646,514 | A | * | 7/1997  | Tsunetsugu ............. 323/288 |
| 6,014,325 | A | * | 1/2000  | Pecore .................... 363/126 |

* cited by examiner

*Primary Examiner*—Robert L. Deberadinis
(74) *Attorney, Agent, or Firm*—Leydig, Voit & Mayer, Ltd.

(57) ABSTRACT

The positive half-cycle for an ac input signal is applied to a wave rectifier (20, 22), a filter (41) and a voltage regulator (30, 31) for generating a dc output signal. The ac input signal is also applied to a transistor (50) in either the common emitter or common source configuration which shifts the ac input signal by 180 degrees. This signal is then applied to another rectifier (21, 23) for converting the shifted ac input signal into a pulsating dc output signal. Then shifted dc output signal is applied to a second capacitor filter to reduce the signal variations. The final stage for the second output stage is also a voltage regulator (32, 33) (i.e., two series zener diodes). The transformerless power supply produces either a dual positive or dual negative dc voltage supply. In addition, the voltage supply circuits may include a relay voltage, which may be controlled by a control circuit.

23 Claims, 9 Drawing Sheets

TRANSFORMERLESS POWER SUPPLY, DUAL POSITIVE OR DUAL NEGATIVE SUPPLIES

CROSS-REFERENCE TO RELATED PATENT APPLICATION

This patent application is a 371 of International Application No. PCT/US00/04152 filed Feb. 18, 2000, which claims priority to the originally filed Provisional Application No. 60/120,586 filed Feb. 18, 1999, the teachings and disclosure of which are hereby incorporated in their entireties by reference thereto. This PCT application was published in English.

FIELD OF THE INVENTION

The present invention relates to a transformerless direct current (dc) power supply. More particularly, this invention is directed to a circuit for being interconnected to a high voltage alternating current (ac) supply producing either a dual positive or a dual negative dc power supply.

DESCRIPTION OF THE RELATED TECHNOLOGY

Figure 7:
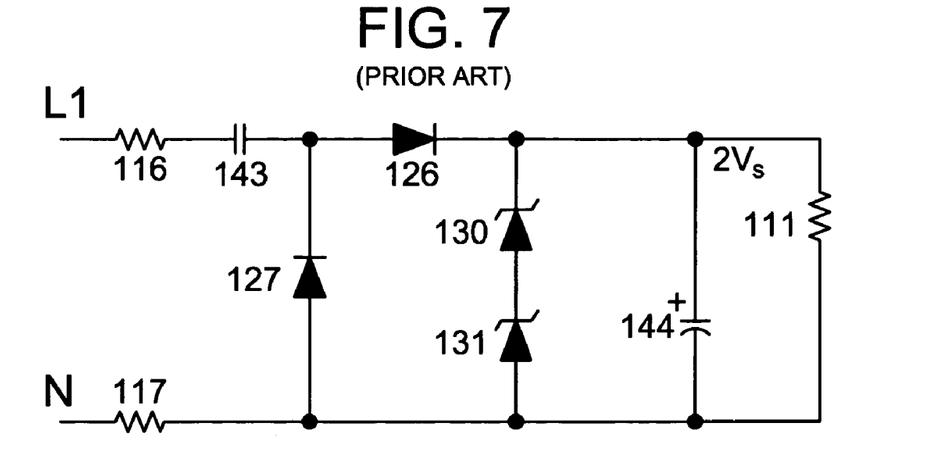
FIG. 7 shows a prior art power supply.

Transformerless capacitor arrangements for creating a low voltage direct current source are well known in the field of power supplies. One simple example is the half-wave voltage doubler consisting of two diodes and two capacitors. The circuit is shown in FIG. 7, along with its voltage source, load resistance and voltage regulator.

The operation of the half-wave doubler is easy to understand. During the negative alterations of the ac input, diode (126) is reversed biased and diode (127) is forward biased by the ac input signal polarity. Capacitor (143) is charged until its plate-to-plate voltage is equal to the source voltage. At the same time, capacitor (144) is discharging through the load resistance.

When the ac input polarity reverses, diode (127) is off. Capacitor (413) is charged to the peak value of $V_{L1(PK)}$ and the source voltage now acts as a series-aiding source. Thus, capacitor (144) is charged to the sum of the series of peak voltages, $2 V_{L1(PK)}$.

When $V_s$ returns to its original polarity, diode (126) is again turned off. Once diode (126) is off, the only charge path for capacitor (144) is through the load resistance. Normally, the time constant of this current circuit will be such that capacitor (144) has little time to lose any of its charge before the input reverses polarity again. In other words, during the negative alteration of the input, capacitor (144) will be discharged slightly. Then, during the positive alterations, diode (126) is turned on and capacitor (144) recharges until its plate-to-plate voltage again equals $2V_{L1(PK)}$.

Figure 6:
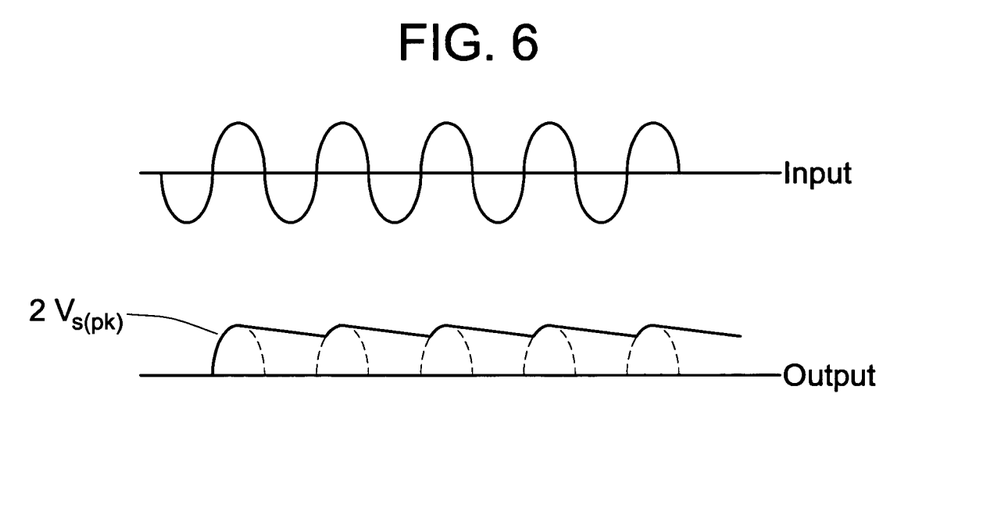
FIG. 6 shows typical input and output waveforms for a half-wave voltage doubler.

Since capacitor (144) barely discharged between input cycles, the output wave-form of the half-wave voltage doubler closely resembles that of a filtered half-wave rectifier. Typical input and output waveforms for a half-wave voltage doubler are shown in FIG. 6. As the figure shows, the circuit will have a dc output voltage and a ripple voltage that closely resembles the output from a filtered rectifier. The dc output voltage is approximated as $$V_{dc} = 2V_{L1(PK)}$$

The output ripple voltage is calculated using the same process that was used for the filtered half-wave rectifier.

$$V_r \cong \frac{I_L t}{C}$$

where $V_r$=ripple voltage peak-to-peak
 $I_L$=dc load current
 t=time between charging peaks
 C=capacitance Incidentally, if the directions of diodes 126 and 127 are reversed, the result is a negative half-wave voltage doubler.

Figure 8:
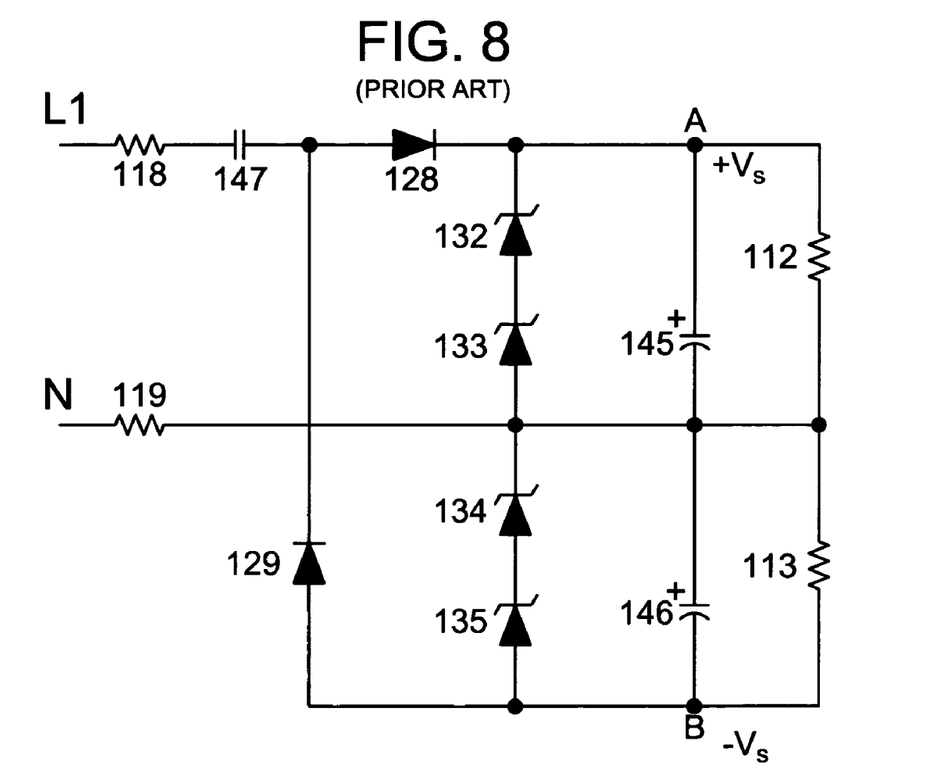
FIG. 8 shows a prior art dual power supply.

One application for the voltage multiplier can be seen in a basic dual-polarity dc power supply. A dual-polarity supply is one that provides both a positive and a negative dc output voltage. One such supply is shown in FIG. 8. Thus, point A will be positive with respect to ground and point B will be negative with respect to ground. Note that the two dc output voltages will be approximately equal to the magnitude of $V_{L1(PK)}$. For example, if $V_{L1(PK)}$ is 24 $V_{pk}$, the power supply will have outputs that are approximately equal to +24 $V_{dc}$ and -24 $V_{dc}$. Conventional transformerless capacitor arrangements produce one negative and one positive supply thus requiring more energy. These supplies are exemplified in U.S. Pat. No. 5,440,443 and U.S. Pat. No. 5,365,146, the disclosures of which are incorporated herein by reference. It is the Applicant's believe that the prior art has not used a transformerless capacitor arrangement for converting either the positive or negative supply to the opposite polarity.

SUMMARY OF THE INVENTION

The present invention provides a dual positive or a dual negative output power supply instead of the traditional one positive and one negative output supply. The direct current (dc) power supply unit has a transformerless capacitor arrangement for creating a first low voltage dc output and a second low voltage dc output from an alternating current (ac) power supply wherein the second dc output has the same plurality of the first dc output. Inverting the polarity is accomplished by a transistor in either the common emitter configuration or the common source configuration.

In another embodiment, a relay voltage may be provided that may be controlled by a microprocessor.

An object of the invention is to provide a circuit that delivers two positive and two negative power supply voltages as opposed to the single negative and single positive power supply previously disclosed.

It is an object of the present invention to cost effectively simulate the power generated from a full wave rectifier circuit.

It is an object of the present invention to provide a low power source for electronic controls.

It is an object of the present invention to provide a safety feature for a power supply.

DETAILED DESCRIPTION OF THE PREFERRED EMBODIMENT

A power supply can be broken down into three circuit groups: rectifier, filter and voltage regulator. In the first group, an alternating current (ac) input signal is applied to a rectifier circuit for converting the ac input signal into a pulsating (dc) output signal. This pulsating dc output signal is then applied to a filter circuit to reduce the variations in the dc voltage. The final stage is the voltage regulator circuit which is used to maintain a constant output signal.

According to an advantageous feature of the invention, an ac input signal may be applied to a first wave rectifier for a positive-half cycle of the ac input signal to produce a pulsating dc output signal. The output signal of the first wave rectifier may then be applied to a first filter and first voltage regulator (e.g., one zener diode or two zener diodes) to produce a first power supply. During the negative-half cycle of the ac input signal, a transistor in either a common emitter or common source configuration may be used to shift the ac input signal by 180 degrees. This shifted voltage is then applied to a second rectifier for converting the shifter ac input signal into a pulsating dc output signal. Finally, the output of the second filter is applied to a second voltage regulator (e.g., one zener diode or two series zener diodes) to produce a second power supply. The second power supply will have the same polarity as the first power supply.

Figure 3:
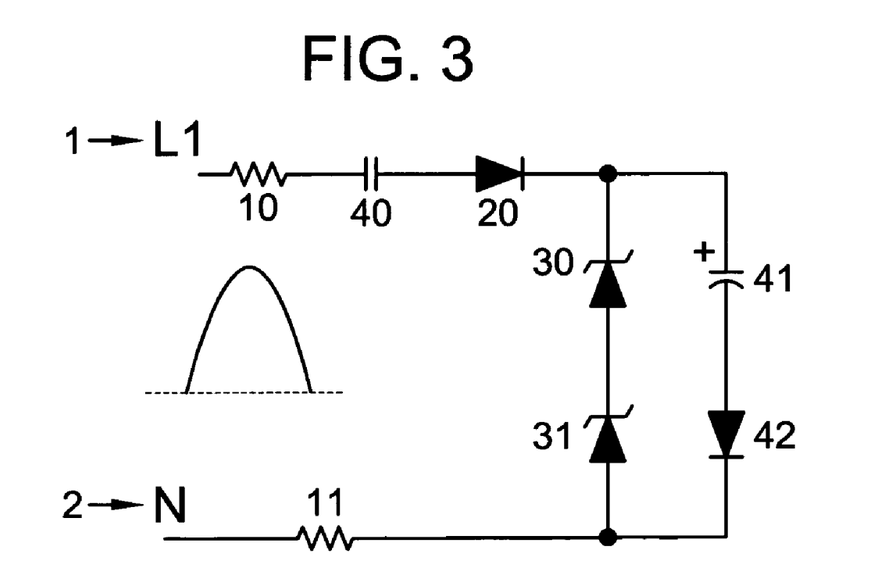
FIG. 3 shows the details of the circuit during the positive-half when capacitor voltage reaches the zener threshold.
Figure 4:
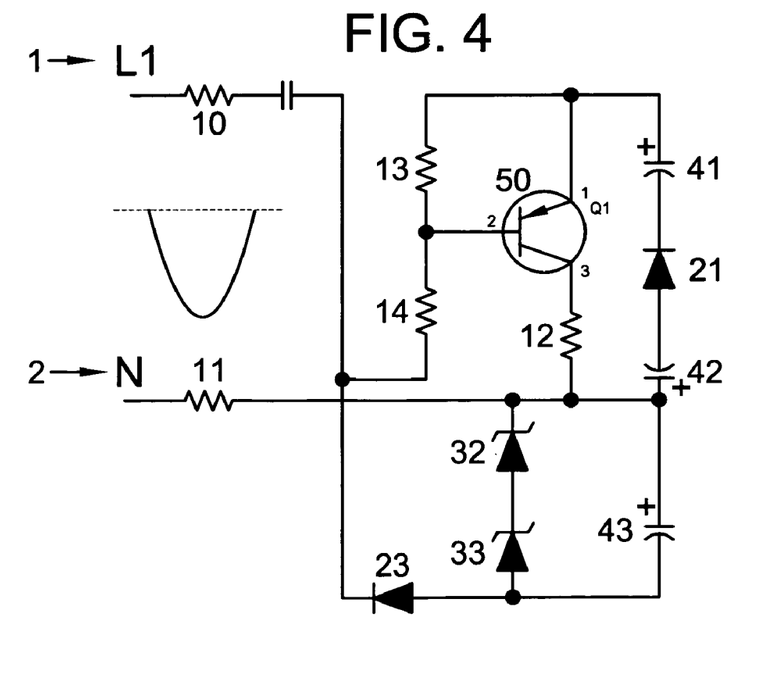
FIG. 4 shows the details of the circuit during the negative-half when capacitor voltage reaches the zener threshold.
Figure 5A:
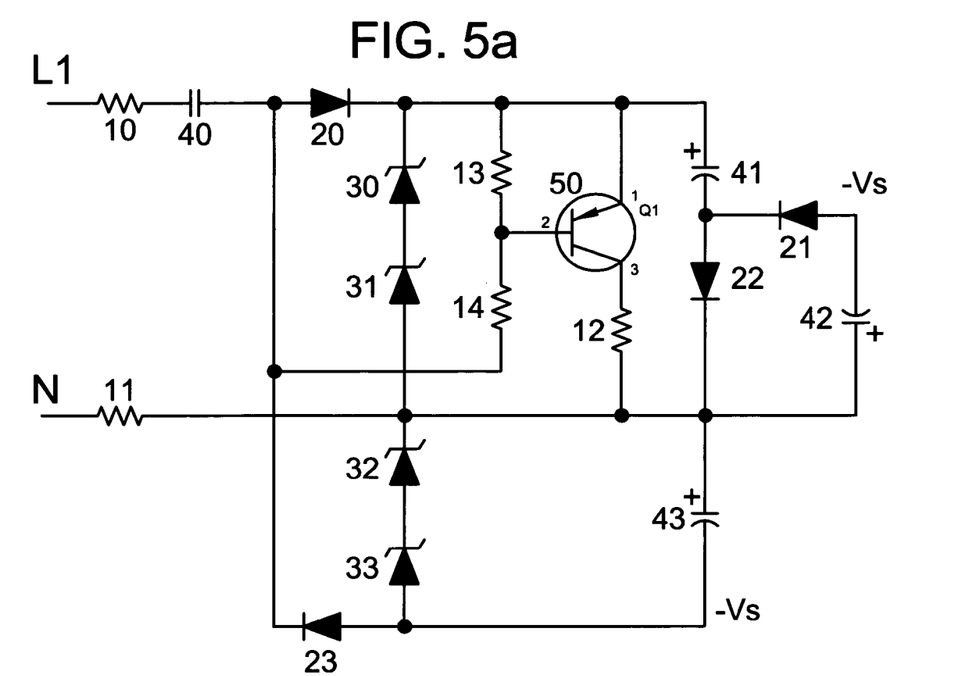
FIG. 5A shows a dual negative supply.

FIG. 5A shows the operation of the above embodiment. FIGS. 1–4 break down the operation of FIG. 5A into half cycles of the input ac input signal (i.e., positive-half cycle and negative-half cycle). FIGS. 1–4 only show the active components of the circuit during the particular half cycle.

Figure 1:
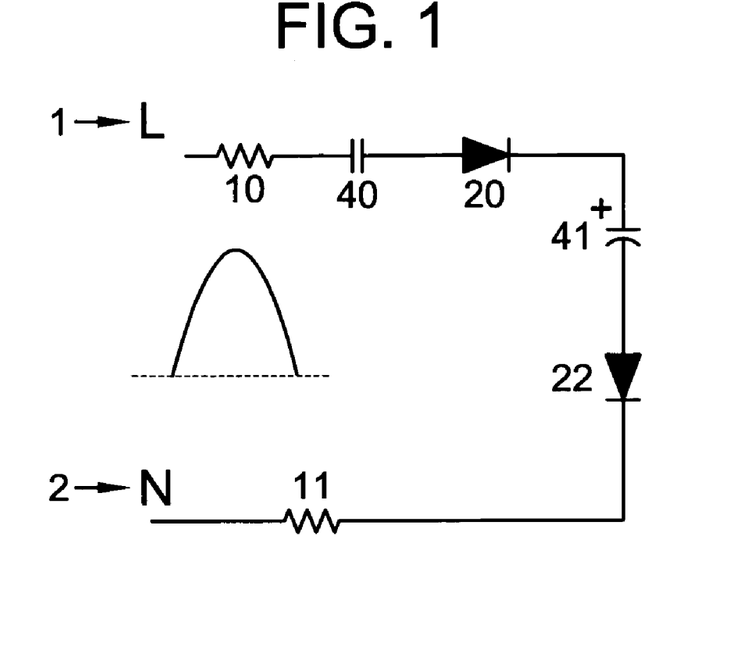
FIG. 1 shows the details of the circuit during the positive-half line cycle.

FIG. 1 show the positive-half of an ac input signal during the first few cycles of the ac input signal (i.e., when the voltage at $L_1$ (1) is positive). On the positive-half cycle, diode (20) will conduct current that flows through capacitor (41), diode (22), resistor (11), and then back to neutral (2). The voltage that is developed across capacitor (41) (approximately 7 v/step in this case) is a function of the value capacitor (40) and capacitor (41) and the number of iterations (each cycle) that this process undergoes. For the first few cycles of the ac input signal, zener diodes (30 and 31) are not active components in the circuit and only become active after capacitor voltage reaches the zener threshold as seen in FIG. 3. Furthermore, during the positive-half cycle of the ac input signal, transistor (50) will be in the off state.

Figure 2:
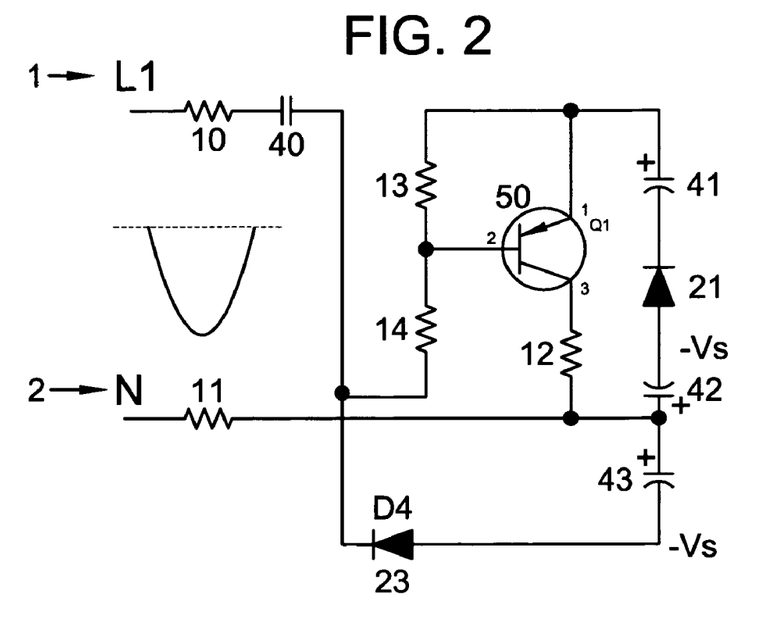
FIG. 2 shows the details of the circuit during the negative-half line cycle.

FIG. 2 shows the active components of the embodiment when the voltage at $L_1$ (1) is negative. During the negative-half cycle of the ac input signal, diode (23) may conduct current that flows into capacitor (43), through resistor (11) and then back to neutral (2). The voltage that is developed across capacitor (43) (approximately 1.5 v/step in this case) is a function of the values of capacitors (40 and 43) and the number of iterations that this process undergoes. For the first few cycles of the ac input signal, zener diodes (32 and 33) may not be active components in the circuit. As shown in FIG. 4, the zener diodes become active after the capacitor voltage reaches the zener threshold. The transistor (50) will be turned on as soon as the line voltage goes negative and when this occurs, capacitor (41) is then discharged into capacitor (42). The discharge path is: transistor (50) collector to emitter, to resistor (12), to capacitor (41), to diode (21), to capacitor (42). This results in a voltage reversal at the anode of diode (21). This process will continue until the voltage on capacitor (42) is equal to the combined zener voltages of zener diode (32) and zener diode (33). The values of resistor (13) and resistor (14) determine the actual voltage threshold for transistor (50), and resistor (12) is present to limit the collector current to some tolerable level.

Figure 5B:
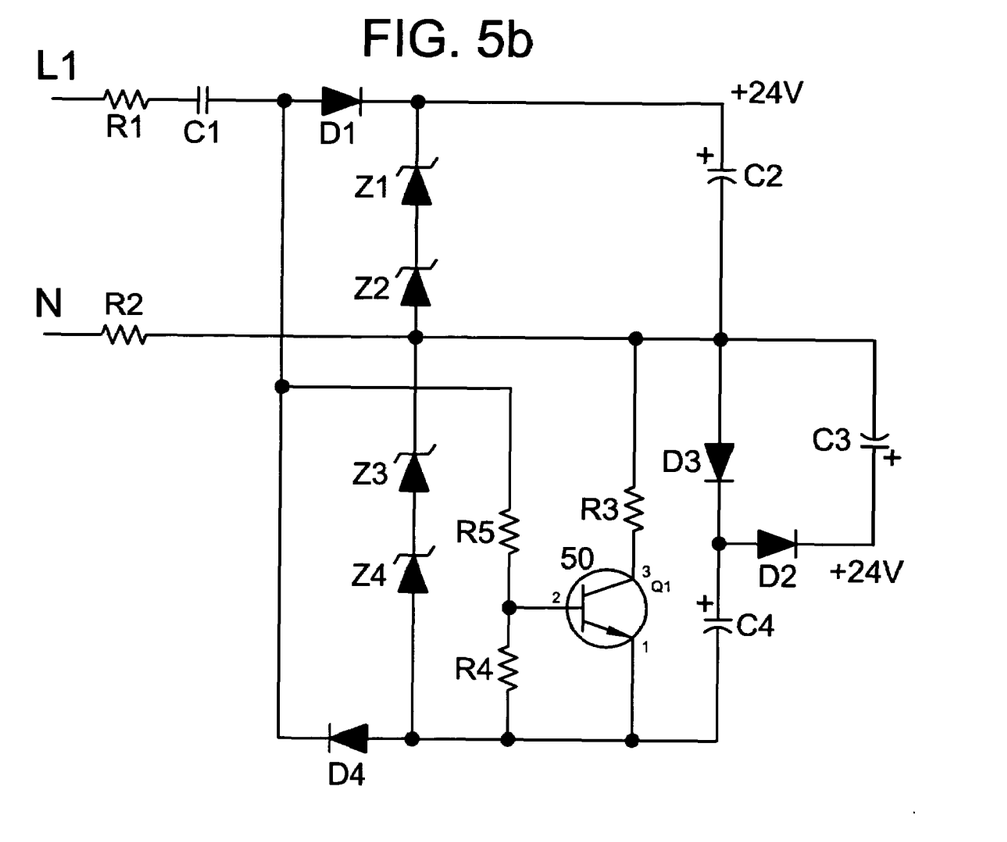
FIG. 5B shows a dual positive supply.
Figure 5C:
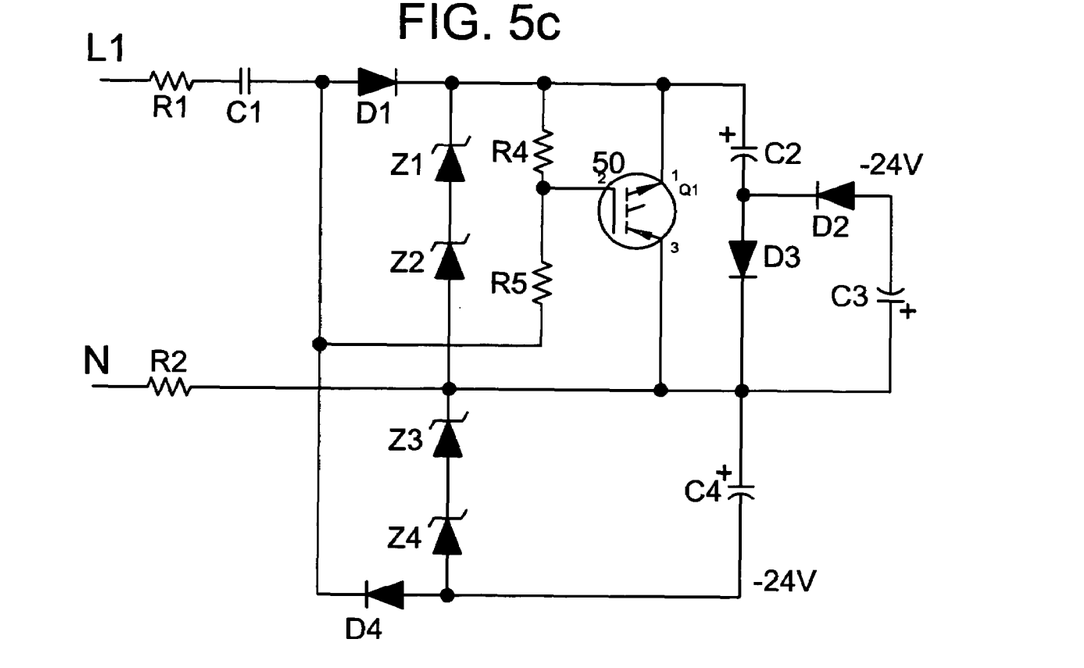
FIG. 5C shows an alternate dual negative supply.
Figure 5D:
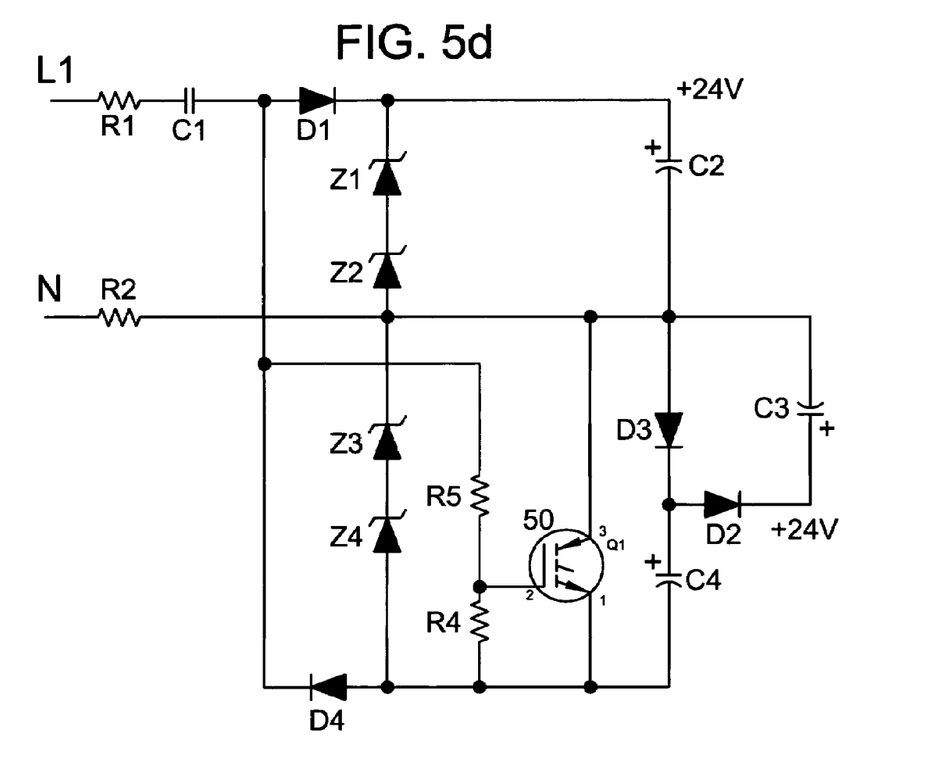
FIG. 5D shows an alternate dual positive supply.

In FIG. 5A (for dual negative supplies) and FIG. 5B (dual positive supplies), transistor (50) is shown in the common emitter configuration. FIG. 5c (dual negative supplies and 5D (dual positive supplies) show transistor (50) in the common source configuration.

The end result is the circuit may deliver two positive or two negative power supplies as opposed to the single negative and single positive power supply disclosed as prior art.

in another embodiment of the invention, a dual positive or dual negative power supply circuit may include a relay voltage ($V_1$), which may be controlled by a microprocessor to provide a safety feature for an electronic device. The relay voltage may be used to power additional circuits, which require insulation from component faults. For example, the relay voltage may be used to power a gas valve. If the gas valve is unintendedly activated, a fire may inadvertently occur.

Figure 9:
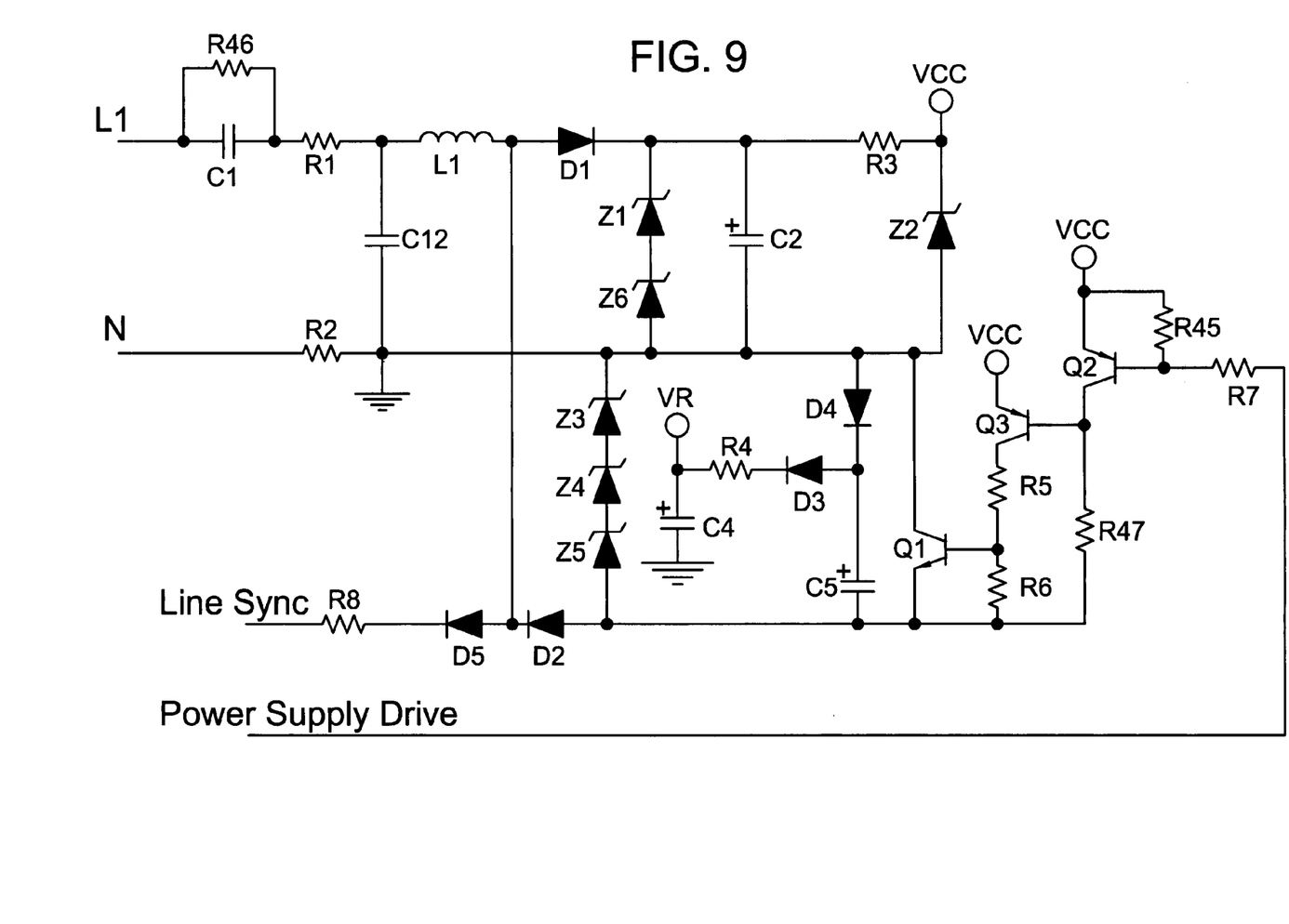
FIG. 9 shows another embodiment of the invention.

In FIG. 9, an embodiment of the invention is shown with dual positive power supplies. The component values shown in FIG. 9 are for illustrative purposes only and are not intended to limit disclosure. Dual negative power supplies may be provided similar to the previous embodiments by simple component modifications.

FIG. 9 shows an embodiment of the invention that is similar to the embodiment shown in FIG. 5B with the exception of $R_4$ and $R_5$. In FIG. 5B, during the negative-half cycle of the ac input signal, $R_4$ and $R_5$ appropriately cycled $Q_1$ to develop voltage on $C_3$, in order to provide a second positive voltage supply, which may be the same polarity as the first supply voltage. In the embodiment FIG. 9, $R_4$ and $R_5$ (FIG. 5B) may be replaced with a level shifter circuit including the following elements: $R_5$, $R_6$, $R_{47}$, $Q_9$ and $Q_2$. In addition, for safety, $D_5$ and R8 may be added to provide a line synchronization to a microprocessor (not shown). This configuration allows a microprocessor to directly control this portion of the power supply. When the microprocessor controls this portion of the circuit, the power supply may be directly inhibited to prevent any voltage from building at relay supply voltage $V_R$. If the relay supply voltage is inhibited, a single component fault (e.g., shorted drive transistor connected to the relay coil) will not cause the relay to activate without permission from the microprocessor. Furthermore, the relay voltage may be disabled by leaving $Q_1$ continuously activated.

In FIG. 9, line voltage ($L_1$) may be connected to reactive element $C_1$ (2.7 uF 250V) to provide a voltage drop in the supply and to introduce a +90° current phase shift. Resistor $R_{46}$ (1.0 MΩ 0.25 W) may be connected in parallel with $C_1$ to dissipate any charge remaining when power is removed. $C_1/R_{46}$, may then be connected to current limiting resistors $R_1$ and $R_2$ (27Ω 1 W each). Note that $R_2$ is in series with neutral. This is followed by shunt capacitor $C_{12}$ (0.047 uF 100V) and series inductor $L_1$ (560 uH) for noise filtering.

The filter's output may then be fed to rectifier diodes $D_1$, $D_2$, $D_4$ and $D_5$ (1N4007 each), and is also sent to the line sync circuit.

Similar to the previous embodiments, during the negative half-cycles of the ac input signal, the signal may be applied to the rectifier circuit, diodes $D_2$ and $D_4$. The diodes conduct to charge filter capacitor $C_5$ (100 uF 63V). The voltage may be limited or regulated by a series string of zener diodes $Z_3$, $Z_4$, and $Z_5$ (18V 1N4746 each) connected across $D_4$ and $C_5$. The output of the voltage regulator circuit, $Z_3$, $Z_4$, and $Z_5$, may be a first dc output voltage exhibiting a first polarity.

During the positive half-cycles of the input signal, diode $D_1$ conducts to charge filter capacitor $C_2$ (100 uF 16V). The voltage across $C_2$ may be clamped or regulated by a voltage regulator, shunt zener diode $Z_1$ and $Z_6$ (5.1V 1N4733A each). This node may then be fed through resistor $R_3$ (22Ω 0.25 W) to shunt zener diode $Z_2$ (5.1V 1N5993), which results in a regulated 5 dc ($V_{cc}$), a second dc output voltage with the same polarity as the first dc output voltage. $V_{cc}$ may be used by the microprocessor and other related circuitry.

In this embodiment, a relay supply voltage ($V_R$) may be established during positive half-cycles of the ac input signal by transferring a charge from capacitor $C_5$ to $C_4$ (470 uF 63V) trough diode $D_3$ (1N4007) and resistor $R_4$ (51Ω 0.25 W). The circuit may be completed by turning on transistor $Q_1$ (MPSA06) to provide a return path to $C_5$. $Q_1$ may be controlled by a microprocessor (not shown) through a level shifter made up of transistors $Q_2$ (2N2907) and $Q_9$ (MPSA56) along with resistors $R_5$ (1.5Ω 0.25 W), $R_6$ (47Ω 0.25 W), $R_{47}$ (47 kΩ 0.25 W), $R_{45}$ (470 kΩ 0.25 W), and $R_7$ (470 kΩ 0.25 W). Furthermore, the relay voltage may be disabled by leaving $Q_1$ continuously activated. The microprocessor must provide a signal to $Q_2$ for $V_R$ to develop voltage. If the microprocessor fails to provide a synchronized signal to $Q_2$, the relay voltage will not develop.

The microprocessor may require synchronization with the incoming signal to properly operate the circuit. If the line synchronization is lost, the control will lock out. The line sync circuit generates a logic level square wave at line frequency. This signal may be used by the microprocessor and other circuitry for synchronization.

The input of the line sync section is connected to the output of the power supply's front end. Then diode $D_5$ (LN4007) rectifies the ac signal such that the current flows only for positive-half cycles of the input signal. $D_5$ is followed by $R_8$ (16 kΩ 0.25 W), which is then connected to pull-down resistor $R_9$ (47Ω 0.25 W) (not shown).

The junction of $R_8$ and $R_9$ may be connected to the microprocessor, where input clamping diodes will milt the peak voltage to one diode drop above +5V. This voltage may also be fed to other circuitry.

I claim:

1. A dual output transformerless power supply comprising:
   a first dc output stage responsive to an ac input, having a first wave rectifier including at least one diode with a regulated dc output exhibiting a first polarity, and including a first voltage regulator having at least one zener diode; and
   a second dc output stage responsive to said ac input, having a second wave rectifier including at least one diode with a regulated dc output inverted by an inverter connected to said second wave rectifier to be said first polarity, and including second voltage regulator having at least one zener diode.

2. A dual output transformerless power supply, according to claim 1, further comprising:
   a first capacitor connected to said first dc output stage; and
   a second capacitor connected to said second do output stage.

3. A dual output transformerless power supply, according to claim 1, wherein:
   said first voltage regulator circuit is connected to said first wave rectifier; and
   said second voltage regulator circuit is connected to said second wave rectifier.

4. A dual output transformerless power supply, according to claim 1, further comprising:
   said first voltage regulator circuit connected to said first wave rectifier having one or more zener diodes in series connected to a first filter; and
   said second voltage regulator circuit connected to said second wave rectifier having one or more zener diodes in series connected to a second filter.

5. A dual output transformerless power supply, according to claim 1, further comprising:
   said first voltage regulator circuit connected to said first wave rectifier having a first and second zener diode in series; and
   said second voltage regulator circuit connected to said second wave rectifier circuit having a first and second zener diode in series.

6. A dual output transformerless power supply, according to claim 1, further comprising:
   a first capacitor connected to the output of said first wave rectifier; and
   a second capacitor connected to the output of said second wave rectifier.

7. A dual output transformerless power supply, according to claim 1, further comprising:
   a relay voltage which is controlled by a microprocessor.

8. A dual output transformerless power supply, according to claim 7, wherein the microprocessor is controlled by a level shifter circuit.

9. A dual output transformerless power supply comprising:
   a first dc output stage responsive to an ac input, having a first wave rectifier including at least one diode with a regulated dc output exhibiting a first polarity, and including a first voltage regulator having at least one zener diode; and
   a second dc output stage responsive to said ac input, having a second wave rectifier including at least one diode with a regulated dc output inverted by an inverter connected to said second wave rectifier to be said first polarity, and including second voltage regulator having at least one zener diode, wherein said inverter includes a transistor connected to said second wave rectifier.

10. A dual output transformerless power supply, according to claim 9, wherein said inverter includes a transistor in a common emitter configuration connected to said second wave rectifier.

11. A dual output transformerless power supply, according to claim 9, wherein said inverter includes a transistor in a common source configuration connected to said second wave rectifier.

12. A dual output transformerless power supply comprising:
   first means for rectifying an ac input generating a first dc output signal having a first polarity;
   second means for rectifying an ac input generating a second dc output signal; and
   means for inverting said second dc output signal to be said first polarity.

13. A dual output transformerless power supply, according to claim 12, further comprising:
first means for filtering said first dc output signal.
14. A dual output transformerless power supply, according to claim 13, further comprising:
second means for filtering said second dc output signal.
15. A dual output transformerless power supply, according to claim 12, further comprising:
second means for filtering said second dc output signal.
16. A dual output transformerless power supply, according to claim 12, further comprising:
first means for voltage regulation of said first dc output signal.
17. A dual output transformerless power supply, according to claim 16, further comprising:
second means for voltage regulation of said second dc output signal.
18. A dual output transformerless power supply, according to claim 12, comprising:
second means for voltage regulation of said second dc output signal.
19. A dual output transformerless power supply comprising:
first means for rectifying an ac input generating a first dc output signal having a first polarity;
second means for rectifying an ac input generating a second dc output signal having said first polarity; and
means for shifting said ac input 180 degrees for input into said second means for rectifying.
20. A dual output transformerless power supply comprising:
first means for rectifying an ac input generating a first dc output signal having a first polarity;
first means for filtering said first dc output signal connected to said first means for rectifying;
first means for voltage regulation connected to said means for filtering;
second means for rectifying an ac input generating a second dc output signal having said first polarity;
second means for filtering said second dc output signal connected to said second means for rectifying;
second means for voltage regulation connected to said second means for filtering;
means for inverting connected to said second means for voltage regulation.
21. A method for providing a dual output transformerless power supply comprising the steps of:
converting an ac input signal during a first half-cycle to a first dc output with a first polarity;
converting the ac input during a second half-cycle to a second dc output with the same polarity as the first dc output by inverting the second dc output.
22. A method for providing a dual output transformerless power supply, according to claim 21, further comprising the step of:
providing a relay voltage.
23. A method for providing a dual output transformerless power supply, according to claim 22, further comprising the step of:
controlling the relay voltage with a control circuit.

* * * * *